United States Patent [19]
Chiba et al.

[11] Patent Number: 6,120,924
[45] Date of Patent: Sep. 19, 2000

[54] PEROVSKITE-TYPE OXIDE MATERIALS CONTAINING NICKEL AND IRON FOR AIR ELECTRODE AND SOLID OXIDE FUEL CELL USING THE SAME

[75] Inventors: Reiichi Chiba; Fumikatsu Yoshimura; Yoji Sakurai, all of Tokyo, Japan

[73] Assignee: Nippon Telegraph and Telephone Corporation

[21] Appl. No.: 09/207,103

[22] Filed: Dec. 7, 1998

[30] Foreign Application Priority Data

Dec. 9, 1997 [JP] Japan ..................... 9-356061

[51] Int. Cl.[7] ..................... H01M 4/00

[52] U.S. Cl. ............... 429/27; 429/30; 429/40; 423/594

[58] Field of Search ................ 429/27, 30, 40, 429/594, 221, 223

[56] References Cited

U.S. PATENT DOCUMENTS 5,411,767 5/1995 Soma et al. .................. 429/31

*Primary Examiner*—Laura Weiner
*Attorney, Agent, or Firm*—Pennie & Edmonds LLP

[57] ABSTRACT

A solid oxide fuel cell, which converts a chemical reaction between a fuel and air or oxygen into electric energy, and which is constructed by a solid electrolyte, an air electrode mounted adjacent to the solid electrolyte, a fuel electrode, and an inter-connector for connecting with other cell units is provided. The air electrode of the above fuel cell is made of a perovskite-type oxide material with a composition expressed by $LnNi_{1-x}Fe_xO_3$ and $YNi_{1-x}Fe_xO_3$ and wherein Ln represents lanthanide elements and x is in a range of 0.30 to 0.60. The perovskite-type oxide materials containing nickel and iron satisfy requirements to provide higher electronic conductivity than the conventional material and closer thermal expansion coefficient to that of the solid electrolyte than that of the conventional air electrode material.

6 Claims, 3 Drawing Sheets

3; FUEL ELECTRODE
2; SOLID ELECTROLYTE
4; INTER-CONNECTOR
$O_2$ (OXYGEN)
$H_2$ (HYDOROGEN)
1; AIR ELECTRODE (CYLINDRICAL POROUS SUBSTRATE)

1; AIR ELECTRODE
2; SOLID ELECTROLYTE

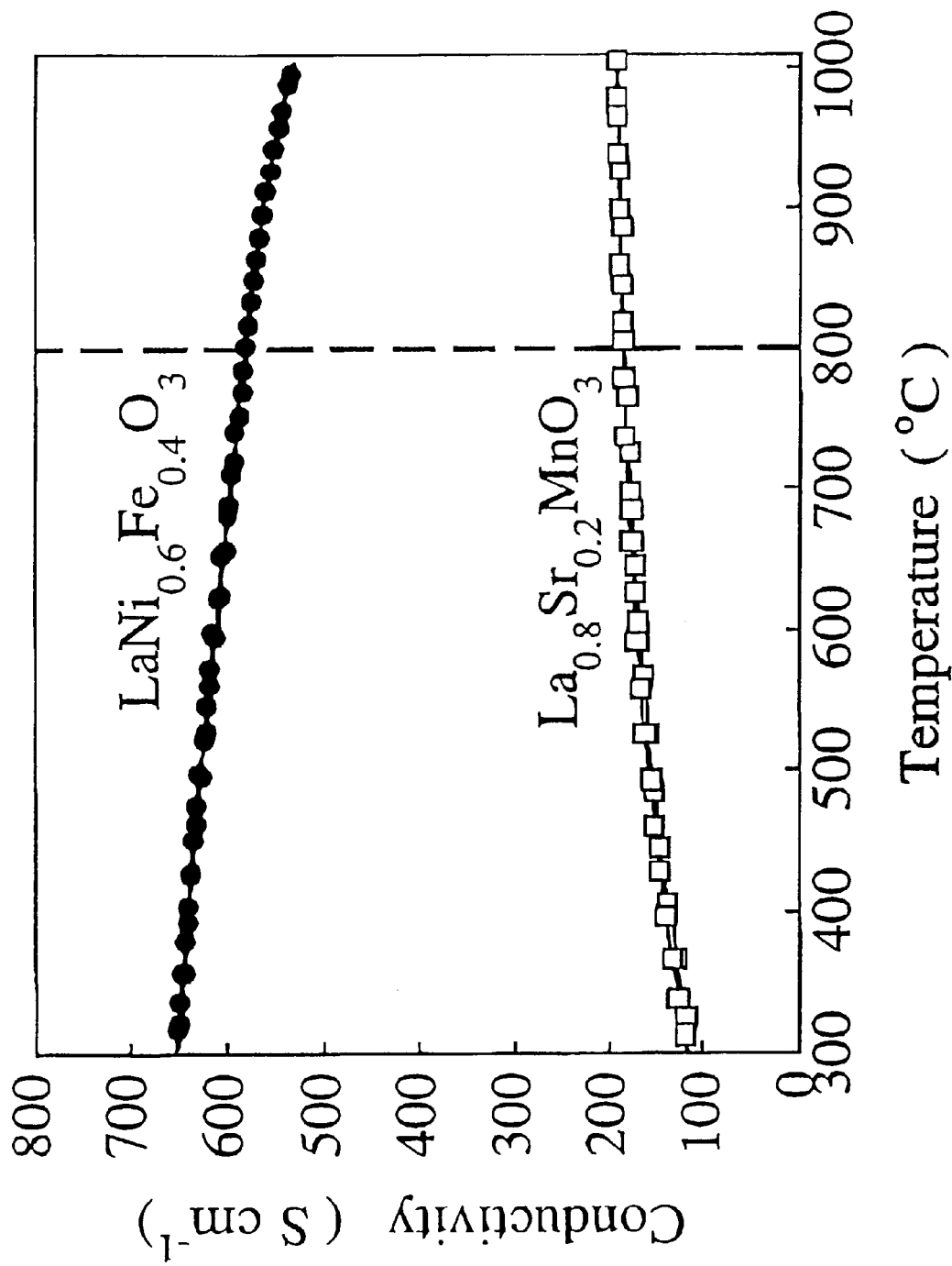

PEROVSKITE-TYPE OXIDE MATERIALS CONTAINING NICKEL AND IRON FOR AIR ELECTRODE AND SOLID OXIDE FUEL CELL USING THE SAME

BACKGROUND OF THE INVENTION

1. Field of the Invention

This invention relates to nickel-iron-type perovskite materials for an air electrode used for a solid oxide fuel cell, and particularly relates to the materials which are capable of improving the reliability of the solid oxide fuel cell and also capable of improving generation efficiency of electricity of this type of fuel cell.

This application is based on Patent Application No. Hei 9-356061 filed in Japan, the contents of which are incorporated herein by reference.

2. Background Art

A fuel cell is a type of gas-electric cell capable of operating for long periods of time, by, on one hand, supplying oxygen or air to the cathode and supplying hydrogen or a hydrocarbon to the anode and, on the other hand, by continuously removing the reaction product (such as $H_2O$ or $CO_2$) from the fuel cell. In particular, from the point of view of effective utilization of energy, the fuel cell has a high conversion efficiency of energy, since the fuel cell is free from the thermodynamic restraints of the Carnot efficiency, so that the fuel cell is expected to be advantageous in environmental protection.

Of the various types of fuel cells, recently, solid oxide type fuel cells have been investigated extensively and, in particular, the solid oxide cells using an ionic conductor of oxygen are attracting attentions.

A tube-type cell unit as a representative example of the solid oxide fuel cell has the structure which is schematically shown in FIG. 1. This tubular cell unit, as shown in FIG. 1, is formed by a cylindrical porous substrate of the air electrode 1, a solid electrolyte 2 and a fuel electrode 3 disposed on the opposite sides of the air electrode 1, and an inter-connector for connecting cell units to each other in the fuel cell. This structure is advantageous in the ease of constructing a sturdy cell and attaining a gas-tight structure. However, a drawback is found that the length of the circuit of the electric current to flow is too long, causing energy loss.

At present, YSZ (Yttrium Stabilized Zirconia) or SASZ (Scandium Aluminum Stabilized Zirconia) are the most promising materials as the solid electrolyte. Although many materials are examined for the air electrode, a manganese-type oxide with a perovskite type structure such as $La_{0.8}Sr_{0.2}MnO_3$ is now being investigated. However, due to its low electric conductivity, the resistance loss of energy of the above perovskite material degrades the power generation efficiency of the fuel cell. Thus, a material with high electronic conductivity is required.

In general, it is necessary to operate a fuel cell at a temperature of 1,000° C. at present. This is because the fuel cell, composed of the air electrode, the fuel electrode, and the solid electrolyte, cannot generate sufficient power effectively at lower temperatures than 1,000° C. However, since high temperatures such as 1,000° C. cause, for example, sintering of the fuel electrode, which degrades the power generation efficiency and which restricts the development of the fuel cell. Thus, it is desired to reduce the operation temperature of the fuel cell to 800° C.

In order to reduce the operation temperature of fuel cells, it is necessary to take many measures. An important point is to improve the electronic conductivity of the air electrode materials such as perovskite-type ceramics.

Among perovskite-type ceramic materials, some example such as $La(Sr)CoO_3$ is known as a conductive material with high electric conductivity. However, a problem arises that cracks may occur at an interface with the solid electrolyte, since this material has an higher expansion coefficient about two-times than that of the solid electrolyte of YSZ or SASZ.

That is, the air electrode material is required to have an approximately equal thermal expansion coefficient to that of the solid electrolyte of YSZ or SASZ. This is required to avoid cracks in the electrolyte caused by a stress originated by mismatching of thermal expansion coefficients between the solid electrolyte and the air electrode in temperature cycles between room temperature and the operation temperature of 1,000° C.

As hereinabove described, there are two essential problems for the conventional tubular cell unit of the fuel cell, one of which is a problem concerning the reliability of the cell unit in term of cracking of the solid electrolyte, and another one of which is a problem concerning the low power generation efficiency caused by the low conductivity of the air electrode.

Here, the thermal expansion coefficients of conventional materials used in a conventional solid oxide fuel cell are shown in Table 1 as a reference.

TABLE 1

Thermal expansion coefficient of materials used in a conventional solid oxide fuel cell

| Materials | Thermal expansion coefficients ($\times 10^6$) (1/K)* |
|---|---|
| YSZ | 10.0 |
| SASZ | 10.0 |
| $La_{0.8}Sr_{0.2}MnO_3$ | 12.0 |
| YSZ-Ni Cermet (Ni: 60 mol %) | 13.0 |
| $La_{0.8}Sr_{0.2}CrO_3$ | 10.0 |

*: average thermal expansion coefficients from 25 to 800° C.

As shown in Table 1, the thermal expansion coefficients of the dense solid electrolytes (YSZ and SASZ) and the inter-connector ($La_{0.8}Sr_{0.2}CrO_3$) are identical. In contrast, a conventional material for the fuel electrode of a cermet represented by Ni-YSZ cermet and the material for the air electrode expressed by $La_{0.8}Sr_{0.2}MnO_3$ have higher thermal expansion coefficients by 20 to 30% than that of the electrolyte of YSZ or SASZ. A 20% to 30% differences in thermal expansion coefficients between the solid electrolyte and the materials for the fuel electrode and the material for the sir electrode might be allowable because the fuel electrode is formed in a porous layer which is capable of absorbing the difference of thermal expansion. However, in order to improve the reliability of the solid oxide fuel cell, a difference in thermal expansion coefficient between the solid electrolyte and the air electrode material is desired to be restricted within 10%, even though the air electrode is formed in a porous body.

It is therefore an object of the present invention to provide a material which has a thermal expansion coefficient close to that of the solid electrolyte, and, at the same time, has a high level of electric conductivity so as not to degrade the energy generation efficiency by a high resistivity.

SUMMARY OF THE INVENTION

According to one aspect of the present invention, the present invention provides a nickel iron perovskite-type material used for an air electrode of a solid oxide fuel cell, which converts the chemical reaction energy between a fuel and air or oxygen into electric energy, and which is constructed by a solid electrolyte, an air electrode mounted adjacent to the solid electrolyte, a fuel electrode, and an inter-connector for connecting cell units in the fuel cell to each other, wherein the perovskite material for the air electrode has a composition expressed by $LnNi_{1-x}Fe_xO_3$ and $YNi_{1-x}Fe_xO_3$, wherein Ln represents lanthanide elements and x is in a range of 0.30 to 0.60.

The above mentioned perovskite-type material for the air electrode has higher electronic conductivity than the conventional material with a composition of $La_{0.8}Sr_{0.2}MnO_3$. At the same time, the air electrode materials with in the system expressed by $LnNi_{1-x}Fe_xO_3$(Ln: lanthanides, x=0.30 to 0.60) and $YNi_{1-x}Fe_xO_3$ (x=0.30 to 0.60) have approximately the same thermal expansion coefficients as the solid electrolyte. Therefore, this type of perovskite-type material satisfy the required properties in terms of higher electronic conductivity and closer thermal expansion coefficients to those of the solid electrolyte.

According another aspect of the present invention, a nickel iron perovskite-type material for the air electrode of the solid fuel cell is provided with compositions expressed by $LnNi_{1-x}Fe_xO_3$ and $YNi_{1-x}Fe_xO_3$, wherein Ln represents lanthanide elements and x is within a range of 0.40 to 0.55.

According to another aspect of the present invention, a nickel iron perovskite-type material for the air electrode wherein the lanthanide elements in the general formula of $LnNi_{1-x}Fe_xO_3$ are at least one element selected from the group consisting of La, Pr, Nd, Sm, and Eu and more than two elements selected from the group consisting of La, Pr, Nd, Sm, Eu, and Ce.

According to another aspect of the present invention, this invention provides a solid oxide fuel cell, which converts a chemical reaction between a fuel and air or oxygen into electric energy, and which is composed of a solid electrolyte, an air electrode mounted adjacent to the solid electrolyte, a fuel electrode, and an interconnector for connection with other cell units, wherein the solid oxide fuel cell is provided with an air electrode made of the perovskite material with a composition expressed by $LnNi_{1-x}Fe_xO_3$ and $YNi_{1-x}Fe_xO_3$ and wherein Ln represents lanthanide elements and x is in a range of 0.30 to 0.60.

According to still another aspect of the present invention, this invention provides a solid oxide fuel cell comprising an air electrode made of a nickel iron perovskite-type material according to the preceding paragraph, wherein the nickel-iron perovskite material is provided with compositions expressed by $LnNi_{1-x}Fe_xO_3$ and $YNi_{1-x}Fe_xO_3$, wherein Ln represents lanthanide elements, and x is within a range of 0.40 to 0.55, and wherein lanthanide elements in said general formula of $LnNi_{1-x}Fe_xO_3$ is at least one element selected from the group consisting of La, Pr, Nd, Sm, and Eu, and more than two elements selected from the group consisting of La, Pr, Nd, Sm, Eu, and Ce.

BRIEF DESCRIPTION OF DRAWINGS

FIG. 4 shows the temperature dependencies of the conductivity of a material expressed as $LaNi_{0.6}Fe_{0.4}O_3$ by the present invention, and a conventional material expressed as $La_{0.8}Sr_{0.2}MnO_3$.

DETAILED DESCRIPTION OF PREFERRED EMBODIMENTS

The present invention will be described below with reference to preferred embodiments and the attached drawings. It should be understood that the present invention is not limited to the described embodiments below.

Figure 1:
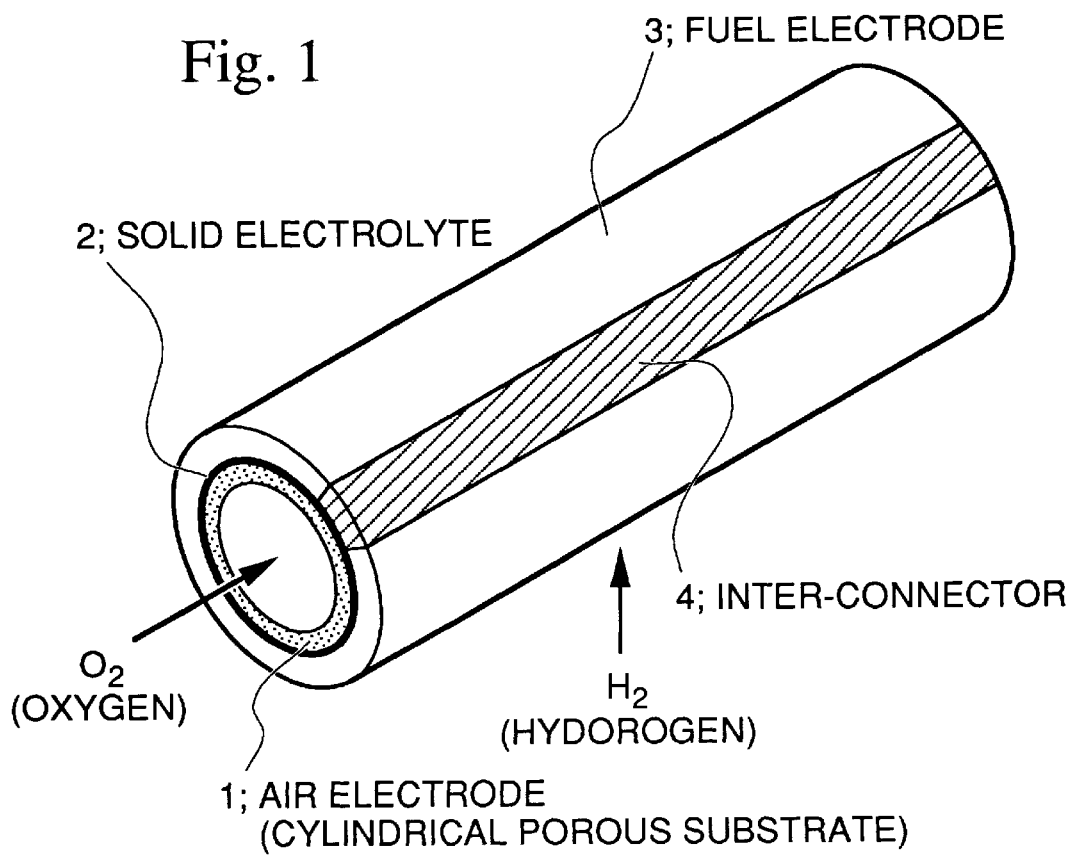
FIG. 1 is a schematic diagram showing the structure of an unit cell of a tube-type fuel cell.

In general, a solid oxide fuel cell is constructed by a plurality of unit cells with cylindrical shapes, as depicted in FIG. 1. Air or oxygen (shown as $O_2$ in FIG. 1), which is one of the reaction gases, is blown in the inside of an electrically conductive air electrode, and hydrogen or hydrocarbon (shown as $H_2$ in FIG. 1), which is the other reaction gas, is blown around the outermost surface of a fuel electrode. As shown in FIG. 1, the solid oxide fuel cell is composed of a solid electrolyte, an air electrode, a fuel electrode, and an inter-connecter. The inter-connector 4 is used for connecting unit cells in the fuel cell to each other.

The above unit cell of the fuel cell shown in FIG. 1 is not necessarily suitable for evaluating the characteristics of fuel cells by changing the air electrode materials. In the present invention, a simplified unit cell and the fuel cell simulation test equipment as illustrated in FIGS. 2 and 3 are used for evaluation of the air electrode materials, and test results were confirmed by assembling practical unit cells as shown in FIG. 1.

First Embodiment

Figure 2:
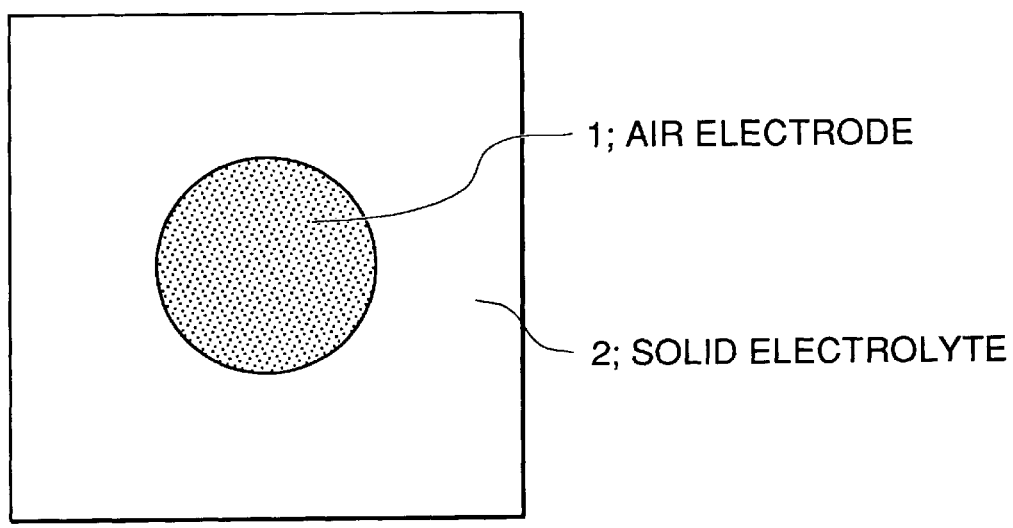
FIG. 2 is a schematic plan view showing a model unit cell of a fuel cell used in each embodiment of the present invention.
Figure 3:
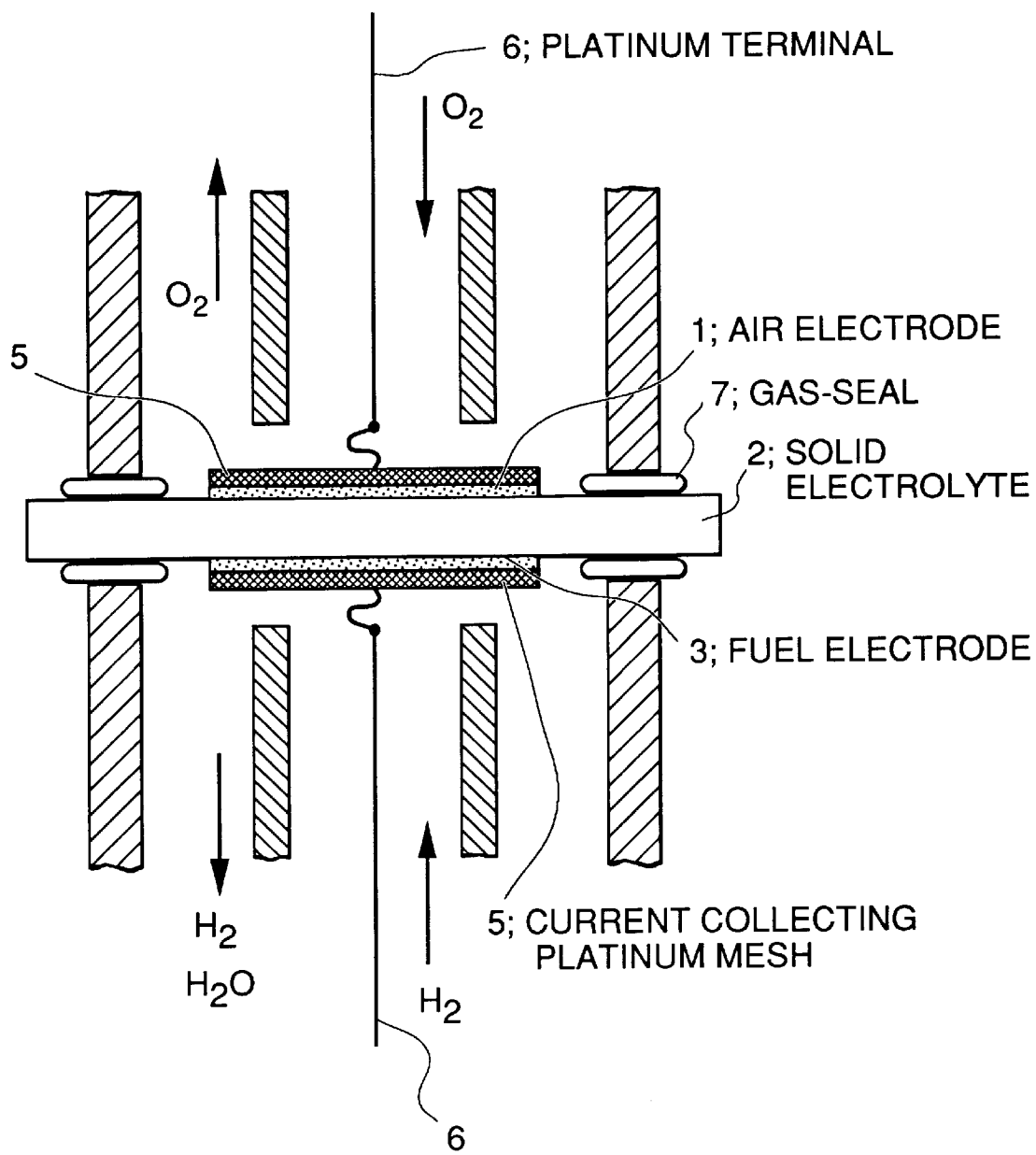
FIG. 3 is a schematic cross-sectional view showing a model unit cell and a model measuring system used in each embodiment of the present invention.

Various materials in the system of $LaNi_{1-x}Fe_xO_3$ (x=0.3, 0.4, 0.5, 0.55, 0.6) for the air electrode were tested using the simplified unit cell shown in FIGS. 2 and 3. FIG. 2 shows a model unit cell used in the tests, and FIG. 3 shows the fuel cell simulation test equipment for evaluating the materials for the air electrode of solid oxide fuel cells. The fuel cell simulation test equipment shown in FIG. 3 was constructed by an air electrode 1, a solid electrolyte 2, a fuel electrode, a current collecting platinum mesh 5, a platinum electrode 6, and a gas seal 7.

In the model unit cell, the air electrode and the fuel electrode were formed with a thickness of 0.2 mm, and the solid electrolyte was formed with a thickness of 0.2 mm and a diameter of 20 mm. SASZ (with a composition of $0.890ZrO_2$-$0.105ScO_3$-$0.005Al_2O_3$) was used for forming the solid electrolyte, and the fuel electrode was formed by Ni-YSZ (containing 60 mol % Ni). Various perovskite materials expressed by the general formula of $La Ni_{1-x}Fe_xO_3$ were used for forming the air electrode.

A method of forming model unit cells is described hereinafter. First, a green sheet of YSZ for the solid electrolyte 2 was formed by a doctor-blade method and the green sheet was sintered at 1400° C. in air. On one surface of the plate of the sintered YSZ, the Ni-YSZ was coated and sintered at 1200° C. to form the fuel electrode 3. On the opposite surface of the plate of the solid electrolyte, a material for the air electrode 1 was coated and sintered at 1,000° C. That is, the air electrode 1 and the fuel electrode 3 were each formed on one of the two surfaces of the plate of the electrolyte 2 and both electrodes were then covered with platinum meshes 5 for collecting electric current. After connecting the platinum terminal 6 to each platinum mesh 5, terminal voltages were measured while flowing oxygen on the air electrode 1 and flowing hydrogen on the fuel electrode 3.

The test results at 800° C. obtained by applying various materials of the present embodiment to the air electrode 1 are shown in Table 2 (Sample Nos.1 to 5). The terminal voltages shown in the Table 2 correspond to voltages measured at the time when the current density was 1.0 A/cm$^2$. Therefore, the higher the terminal voltage, the higher the power generation efficiency of the fuel cell.

Thermal and electrical properties of the materials of this embodiment were measured using sintered blocks. These blocks were prepared by forming green bodies using a mixture of three types of powder of the present embodiment (LaO, NiO, and Fe$_2$O$_3$), and the thus prepared green bodies are calcined and sintered at an temperature range from 1,250 to 1,400° C. to obtain the sintered blocks.

The sintered blocks were then cut into sample bars to be used for measurement of the thermal expansion coefficient in a temperature range ranging from room temperature to 800° C. The composition dependence of the thermal expansion coefficients of the materials in the system of LaNi$_{1-x}$Fe$_x$O$_3$ are shown in Table 2. Here, the thermal expansion coefficients are the average thermal expansion in the temperature range of room temperature to 800° C.

The materials in the system of LaNi$_{1-x}$Fe$_x$O$_3$ of the present embodiment had thermal expansion coefficients closer to the solid electrolyte than that of the conventional material of La$_{0.8}$Sr$_{0.2}$MO$_3$. That is, the thermal expansion coefficient of SASZ used for the solid electrolyte is 10×10$^{-6}$, and that of the conventional material of La$_{0.8}$Sr$_{0.2}$MnO$_3$ was 12×10$^{-6}$, which is larger by 20% than that of the solid electrolyte. In contrast, differences in thermal expansion coefficients between the solid electrolyte and materials in the composition of LaNi$_{1-x}$Fe$_x$O$_3$ (x=0.3 to 0.6) were within around 10%. When practical unit cells are assembled using these materials as the air electrode, damage caused by the difference in thermal expansion was not observed. From the point of view of the thermal expansion coefficient, more preferable materials are obtained in the composition of LaNi$_{1-x}$Fe$_x$O$_3$, when x is in the range of 0.4 to 0.55.

The measurement of the electric conductivity was conducted by the DC four terminal method for the same sample bars used for measurement of the thermal expansion coefficient, after attaching platinum terminals on both ends of the bar by baking. As an example, the temperature dependence of the electric conductivity is shown in FIG. 4 for two materials including the conventional material of La$_{0.8}$Sr$_{0.2}$MnO$_3$ and a material of LaNi$_{0.6}$Fe$_{0.4}$O$_3$ of the present invention. FIG. 4 clearly indicates the improved electrical conductivity of a material of the present embodiment, since the electronic conductivity of the material of this embodiment at an operating temperature of 800° C. is 580 Scm$^{31\ 1}$, which is far higher than 150 Scm$^{-1}$ of the conventional material. Due to this high electric conductivity, when the materials of the present embodiment are used for the air electrode of the solid oxide fuel cell, increased terminal voltages in a range of 0.24 to 0.28 volts are obtained as shown in Table 2, in contrast to the conventional terminal voltage of 0.20 volts.

As described above, the materials for the air electrode in the system of LaNi$_{1-x}$Fe$_x$O$_3$ show preferable in thermal expansion and the electric conductivity properties which lead to generation efficiency of the fuel cell, when x is in a range of 0.3 to 0.6. Furthermore, more desirable properties were obtained for materials in the system of LaNi$_{1-x}$Fe$_x$O$_3$, when x is in the range of 0.4 to 0.55, as shown for Sample Nos. 2 to 4 in Table 2.

Second Embodiment

The same tests as for the first embodiment were conducted, using the same model unit cells, by replacing the air electrode material with five materials in the system of PrNi$_{1-x}$Fe$_x$O$_3$ (where, x=0.3, 0.4, 0.5, 0.55, and 0.6). The test results are shown in Table 2 (Sample Nos. 6 to 10). Every sample material of the present embodiment had a closer thermal expansion coefficient to that of the solid electrolyte than that of the conventional material of La$_{0.8}$Sr$_{0.2}$MO$_3$. In addition, the terminal voltages (at the current density of 1.0 A/cm$^2$) observed for samples 6 to 10 were higher than for the conventional material of La$_{0.8}$Sr$_{0.2}$MnO$_3$, as shown in Table 2. That is, all of sample materials Nos. 5 to 10 showed preferable properties for the air electrode. However, more preferable results were obtained for sample Nos. 7 to 9 in the system of PrNi$_{1-x}$Fe$_x$O$_3$, when x is in the range of 0.4 to 0.55.

Third Embodiment

The same tests as for the first embodiment were conducted, using the same model unit cells, by replacing the air electrode material with five materials in the system of NdNi$_{1-x}$Fe$_x$O$_3$ (where, x=0.3, 0.4, 0.5, 0.55, and 0.6). The test results are shown in Table 2 (Sample Nos. 11 to 15). Every sample material of the present embodiment showed closer thermal expansion coefficient to the solid electrolyte than that of the conventional material of La$_{0.8}$Sr$_{0.2}$MO$_3$. In addition, the terminal voltages (at the current density of 1.0 A/cm$^2$) observed for samples from No. 11 to No. 15 were higher than for the conventional material of La$_{0.8}$Sr$_{0.2}$MnO$_3$. That is, all of sample materials Nos. 11 to 15 showed preferable properties for the air electrode. However, more preferable results were obtained for sample Nos. 12 to 14 in the system of NdNi$_{1-x}$Fe$_x$O$_3$, when x is in the range of 0.4 to 0.6.

TABLE 2

Terminal voltages and thermal expansion coefficients of various materials according to respective embodiments

| Sample No. | Composition of air-electrode materials | *Terminal voltage (V) | *Thermal expansion coefficient (× 10$^6$, 1/K) |
|---|---|---|---|
| Refer. Sample | La$_{0.8}$Sr$_{0.2}$MnO$_3$ | 0.20 | 12.0 |
| 1 | LaNi$_{0.7}$Fe$_{0.3}$O$_3$ | 0.26 | 11.5 |
| 2 | LaNi$_{0.6}$Fe$_{0.4}$O$_3$ | 0.28 | 11.0 |
| 3 | LaNi$_{0.5}$Fe$_{0.5}$O$_3$ | 0.25 | 10.8 |
| 4 | LaNi$_{0.45}$Fe$_{0.55}$O$_3$ | 0.24 | 10.5 |
| 5 | LaNi$_{0.4}$Fe$_{0.6}$O$_3$ | 0.23 | 10.3 |
| 6 | PrNi$_{0.7}$Fe$_{0.3}$O$_3$ | 0.27 | 11.2 |
| 7 | PrNi$_{0.6}$Fe$_{0.4}$O$_3$ | 0.30 | 10.9 |
| 8 | PrNi$_{0.5}$Fe$_{0.5}$O$_3$ | 0.26 | 10.8 |
| 9 | PrNi$_{0.45}$Fe$_{0.55}$O$_3$ | 0.25 | 10.4 |
| 10 | PrNi$_{0.4}$Fe$_{0.6}$O$_3$ | 0.24 | 10.2 |
| 11 | NdNi$_{0.7}$Fe$_{0.3}$O$_3$ | 0.27 | 11.1 |
| 12 | NdNi$_{0.6}$Fe$_{0.4}$O$_3$ | 0.29 | 10.9 |
| 13 | NdNi$_{0.5}$Fe$_{0.5}$O$_3$ | 0.26 | 10.8 |
| 14 | NdNi$_{0.45}$Fe$_{0.55}$O$_3$ | 0.25 | 10.4 |
| 15 | NdNi$_{0.4}$Fe$_{0.6}$O$_3$ | 0.24 | 10.2 |
| 16 | SmNi$_{0.7}$Fe$_{0.3}$O$_3$ | 0.24 | 11.2 |
| 17 | SmNi$_{0.6}$Fe$_{0.4}$O$_3$ | 0.25 | 10.7 |
| 18 | SmNi$_{0.5}$Fe$_{0.5}$O$_3$ | 0.24 | 10.3 |
| 19 | SmNi$_{0.45}$Fe$_{0.55}$O$_3$ | 0.23 | 10.2 |
| 20 | SmNi$_{0.4}$Fe$_{0.6}$O$_3$ | 0.22 | 10.1 |
| 21 | EuNi$_{0.7}$Fe$_{0.3}$O$_3$ | 0.24 | 11.1 |
| 22 | EuNi$_{0.6}$Fe$_{0.4}$O$_3$ | 0.25 | 11.1 |
| 23 | EuNi$_{0.5}$Fe$_{0.5}$O$_3$ | 0.24 | 10.7 |
| 24 | EuNi$_{0.45}$Fe$_{0.55}$O$_3$ | 0.23 | 10.3 |
| 25 | EuNi$_{0.4}$Fe$_{0.6}$O$_3$ | 0.22 | 10.2 |
| 26 | YNi$_{0.7}$Fe$_{0.3}$O$_3$ | 0.24 | 11.2 |
| 27 | YNi$_{0.6}$Fe$_{0.4}$O$_3$ | 0.26 | 10.7 |
| 28 | YNi$_{0.7}$Fe$_{0.3}$O$_3$ | 0.24 | 10.3 |

TABLE 2-continued

Terminal voltages and thermal expansion coefficients
of various materials according to respective embodiments

| Sample No. | Composition of air-electrode materials | *Terminal voltage (V) | *Thermal expansion coefficient ($\times 10^6$, 1/K) |
|---|---|---|---|
| 29 | $YNi_{0.45}Fe_{0.55}O_3$ | 0.23 | 10.2 |
| 30 | $YNi_{0.4}Fe_{0.6}O_3$ | 0.22 | 10.1 |
| 31 | $La_{0.4}Ce_{0.1}Pr_{0.3}Nd_{0.1}Sm_{0.1}$—$Ni_{0.6}Fe_{0.4}O_3$ | 0.28 | 11.2 |

*: Terminal voltages are measured when the current density is 1.0 A/cm$^2$.
*: The thermal expansion coefficients are average thermal expansion of room temperature to 800° C.

Fourth Embodiment

The same tests as for the first embodiment were conducted, using the same model unit cells, by replacing the air electrode material with five materials in the system of $SmNi_{1-x}Fe_xO_3$ (where, x=0.3, 0.4, 0.5, 0.55, 0.6). The test results are shown in Table 2 (Sample Nos. 16 to 20). Every sample materials of the present embodiments showed closer thermal expansion coefficient to that of the solid electrolyte than that of the conventional material of $La_{0.8}Sr_{0.2}MO_3$. In addition, the terminal voltages (at the current density of 1.0 A/cm$^2$) observed for samples 16 to 20 were higher than for the conventional material of $La_{0.8}Sr_{0.2}MnO_3$. That is, all of sample materials Nos. 16 to 20 showed preferable properties for the air electrode. However, more preferable results were obtained for sample Nos. 17 to 19 in the system of $SmNi_{1-x}Fe_xO_3$, when x is in the range of 0.40 to 0.55.

Fifth Embodiment

The same tests as the first embodiment were conducted, using the same model unit cells, by replacing the air electrode material with five materials in the system of $EuNi_{1-x}Fe_xO_3$ (where, x=0.3, 0.4, 0.5, 0.55, and 0.6). The test results are shown in Table 2 (Sample Nos. 21 to 25). Every sample material of the present embodiment showed closer thermal expansion coefficient to that of the solid electrolyte than that of the conventional material of $La_{0.8}Sr_{0.2}MO_3$. In addition, the terminal voltages (at the current density of 1.0 A/cm$^2$) observed for sample Nos. 21 to 25 were higher than for the conventional material of $La_{0.8}Sr_{0.2}MnO_3$. That is, all of sample materials Nos. 21 to 25 showed preferable properties for the air electrode. However, more preferable results were obtained for sample Nos. 22 to 24 in the compositional range of $EuNi_{1-x}Fe_xO_3$, when x is in a range of 0.4 to 0.55.

Sixth Embodiment

The same tests as for the first embodiment were conducted, using the same model unit cells, by replacing the air electrode material with five materials in the system of $YNi_{1-x}Fe_xO_3$ (where, x=0.3, 0.4, 0.5, 0.55, and 0.6). The test results are shown in Table 2 (Sample Nos. 26 to 30). Every sample material of the present embodiment showed closer thermal expansion coefficient to that of the solid electrolyte than that of the conventional material of $La_{0.8}Sr_{0.2}MO_3$. In addition, the terminal voltages (at the current density of 1.0 A/cm$^2$) observed for samples 6 to 10 were higher than for the conventional material of $La_{0.8}Sr_{0.2}MnO_3$. That is, all of sample materials Nos. 26 to 30 showed preferable properties for the air electrode. However, more preferable results were obtained for samples Nos. 26 to 29 in the system of $YNi_{1-x}Fe_xO_3$, when x is in the range of 0.4 to 0.55.

Seventh Embodiment

The same tests as for the first embodiment were conducted, using the same model unit cells, by replacing the air electrode material with a multi-component material with a composition of $La_{0.1}Ce_{0.1}Pr_{0.3}Nd_{0.1}Sm_{0.1}Ni_{0.6}Fe_{0.4}O_3$. The test result is shown in Table 2 (Sample No. 31). The sample material of the present embodiment had closer thermal expansion coefficient to that of the solid electrolyte than that of the conventional material of $La_{0.8}Sr_{0.2}MO_3$. In addition, the terminal voltage (at the current density of 1.0 A/cm$^2$) observed for the sample 31 was higher than the conventional material of $La_{0.8}Sr_{0.2}MnO_3$. That is, the material No. 31 showed preferable properties for the air electrode.

In the above embodiments, although the properties of each material were evaluated by the fuel cell simulation test equipment, it should be understood that the performance of the solid oxide cell can be sufficiently evaluated by use of the simulation test equipment. It was confirmed that the same performances as those measured by the simulation test equipment are obtained by the practical unit cell of the solid oxide fuel cell by applying various nickel iron perovskite-type materials to the air electrode.

As hereinabove described, the performance of the solid oxide fuel cell can be sufficiently improved by applying to the air electrode the nickel-iron perovskite-type materials in the systems of $LnNi_{1-x}Fe_xO_3$ and $YNi_{1-x}Fe_xO_3$ (wherein, Ln represents lanthanide elements and x=0.3~0.6), when the performance is compared with that of the fuel cell using the conventional material in the composition of $La_{0.8}Sr_{0.2}MnO_3$. This favorable effect is caused by the higher conductivity of the air electrode materials than the conventional air electrode material, and closer thermal expansion coefficient of the air electrode materials to that of the solid electrolyte than the conventional material of $La_{0.8}Sr_{0.2}MnO_3$. Accordingly, the present invention contributes to the improvement of the reliability as well as to the high efficiency operation of the solid oxide fuel cell.

What is claimed is:

1. A perovskite-type oxide material containing nickel and iron for an air electrode of a solid oxide fuel cell, which converts chemical reaction energy between a fuel and air or oxygen into electric energy, and which is constructed by a solid electrolyte, an air electrode mounted adjacent to the solid electrolyte, a fuel electrode, and an inter-connector for connecting with other cell units, wherein said perovskite-type oxide material containing nickel and iron for the air electrode has a composition expressed by $LnNi_{1-x}Fe_xO_3$ and $YNi_{1-x}Fe_xO_3$ and wherein Ln represents lanthanide elements and x is in a range of 0.30 to 0.60.

2. A perovskite-type oxide material containing nickel and iron for the air electrode according to claim 1, wherein said perovskite-type oxide material is provided with composition expressed by $LnNi_{1-x}Fe_xO_3$ and $YNi_{1-x}Fe_xO_3$, and wherein Ln represents lanthanide elements, and x is within a range of 0.40 to 0.55.

3. A perovskite-type oxide material containing nickel and iron for the air electrode according to claim 1, wherein lanthanide element in the general formula of $LnNi_{1-x}Fe_xO_3$ are at least one element selected from the group consisting of La, Pr, Nd, Sm, and Eu, or is more than two elements selected from the group consisting of La, Pr, Nd, Sm, Eu, and Ce.

4. A solid oxide fuel cell comprising an air electrode made of a perovskite-type oxide material containing nickel and iron expressed by $LnNi_{1-x}Fe_xO_3$ for the air electrode according to claim 1, wherein the lanthanide elements in said general formula of $LnNi_{1-x}Fe_xO_3$ are at least one element selected from the group consisting of La, Pr, Nd, Sm, and Eu, or is more than two elements selected from the group consisting of La, Pr, Nd, Sm, Eu, and Ce.

5. A solid oxide fuel cell, which converts a chemical reaction energy between a fuel and air or oxygen into electric energy, and which is constructed by a solid electrolyte, an air electrode mounted adjacent to the solid electrolyte, a fuel electrode, and an inter-connector for connecting with other cell units, wherein the solid oxide fuel cell is provided with an air electrode made of the perovskite-type oxide material containing nickel and iron with a composition expressed by $LnNi_{1-x}Fe_xO_3$ and $YNi_{1-x}Fe_xO_3$ and wherein Ln represents lanthanide elements and x is in a range of 0.30 to 0.60.

6. solid oxide fuel cell comprising an air electrode made of a nickel iron perovskite-type material according to claim 5 wherein the perovskite-type oxide material is provided with compositions expressed by $LnNi_{1-x}Fe_xO_3$ and $YNi_{1-x}Fe_xO_3$, and wherein Ln represents lanthanide elements, and x is within a range of 0.40 to 0.55.

* * * * *